Nov. 8, 1966  E. R. GRAY ETAL  3,284,508
RECOVERY OF P-TOLUALDEHYDE
Filed Feb. 18, 1963
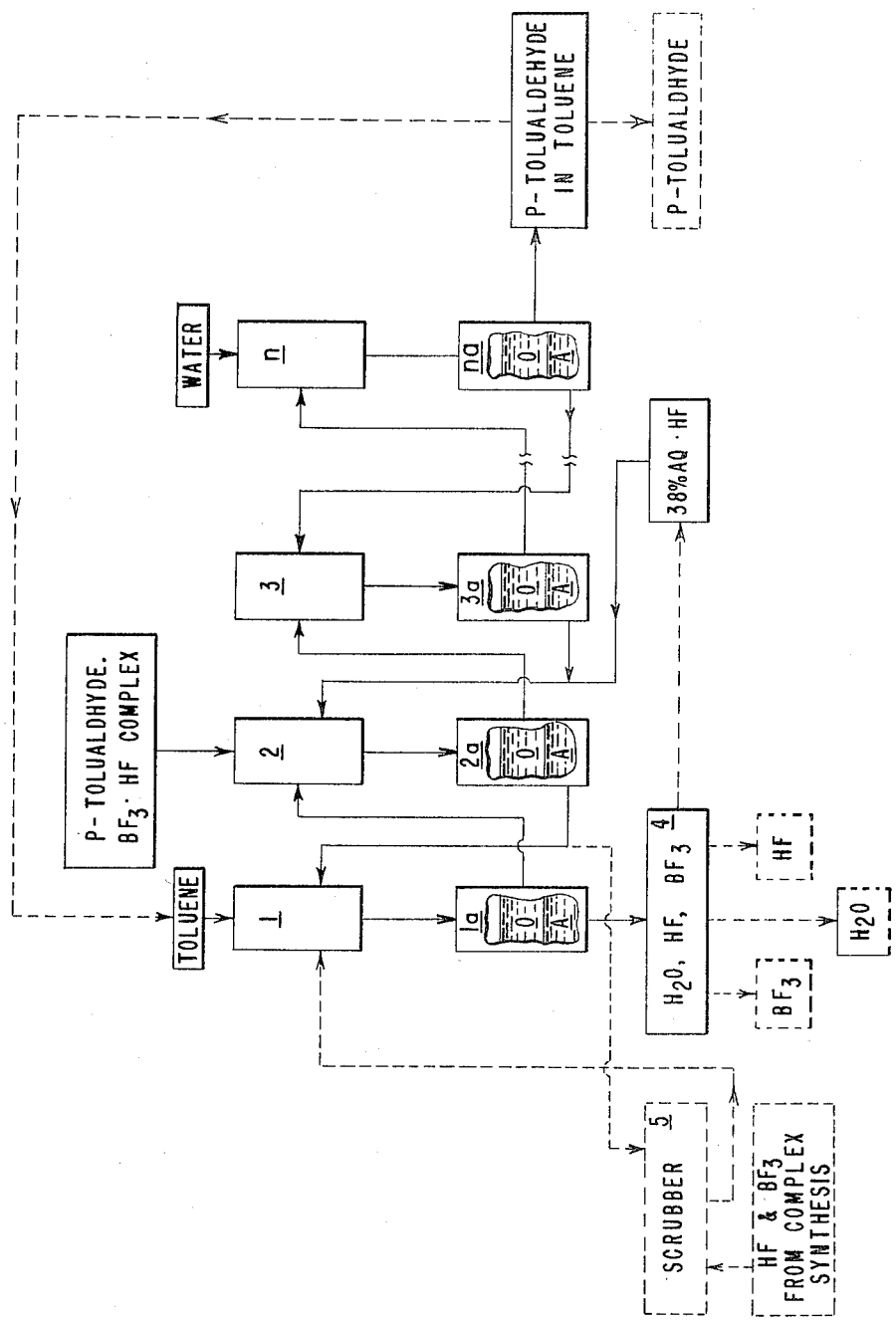
INVENTORS
EUGENE R. GRAY
CHARLES N. MASTEN
GENE M. PETTINGILL
BY *John H. Schmutz*
ATTORNEY

United States Patent Office 3,284,508
Patented Nov. 8, 1966

3,284,508
RECOVERY OF P-TOLUALDEHYDE
Eugene R. Gray and Charles N. Masten, Pitman, N.J., and Gene M. Pettingill, Wilmington, Del., assignors to E. I. du Pont de Nemours and Company, Wilmington, Del., a corporation of Delaware
Filed Feb. 18, 1963, Ser. No. 259,125
7 Claims. (Cl. 260—599)

The present invention relates to a process for the manufacture of p-tolualdehyde. More particularly, this invention relates to a process for treating a crude reaction mixture containing a chemical complex of p-tolualdehyde, hydrogen fluoride, and boron trifluoride.

As described in U.S. Patent No. 2,485,237, p-tolualdehyde may be prepared by reacting toluene with carbon monoxide in the presence of a hydrogen fluoride-boron trifluoride catalyst under essentially anhydrous conditions at temperatures of about −80° C. to +50° C. and superatmospheric pressure, and treating the initial reaction product with water to liberate the p-tolualdehyde. The product obtained initially is a chemical complex of p-tolualdehyde, hydrogen fluoride, and boron trifluoride of somewhat variable composition depending on the conditions of reaction, and usually in mixture with by-products and excess starting materials. In the process, disclosed in U.S. Patent No. 2,485,237, the mixture is subjected to a washing treatment using large quantities of water to break down the chemical complex, and thereby liberate the tolualdehyde, usually in the presence of toluene. The water-washed solution of p-tolualdehyde in toluene then is fractionally distilled. Although p-tolualdehyde is recovered satisfactorily and in good yield by this procedure, economical recovery of the fluorides from the aforementioned large quantities of water is not feasible, thereby resulting in considerable economic penalty for the process and, when carried out on a substantial scale, creating a serious waste-disposal problem.

Other procedures have been proposed for processing synthesis mixtures containing the complex of p-tolualdehyde, boron trifluoride, and hydrogen fluoride in such a way as to provide for recovering not only the p-tolualdehyde, but also the other constituents of the reaction mixture. For instance, U.S. Patent No. 2,462,739 discloses treating the substantially anhydrous reaction mixture with selected metal fluorides which combine with and precipitate both the BF$_3$ and HF, liberating the p-tolualdehyde. The precipitate is separated and heated to its decomposition temperature to liberate a mixture of BF$_3$ and HF. Variations of this procedure have been disclosed in German Patent No. 938,964, and British Patent Nos. 812,064 and 825,225 in which fluoborate salt formation in either aqueous or anhydrous systems is employed to recover the p-tolualdehyde and, separately, the boron trifluoride and hydrogen fluoride. These methods of treating the complex, however, are not free of disadvantages such as high investment and operating costs associated with use and recovery of the metal fluorides, and sometimes poor recovery of either the boron trifluoride or hydrogen fluoride, or both.

Another process for treating a reaction mixture containing the aldehyde-boron trifluoride-hydrogen fluoride complex without use of a metal fluoride is disclosed in U.S. Patent No. 2,534,017 wherein the hydrogen fluoride is evaporated selectively at reduced pressures and temperatures, and the residue is heated in the presence of an inert organic liquid such as toluene whereby the boron trifluoride is expelled, leaving a solution of p-tolualdehyde in toluene; or the residue after evaporating hydrogen fluoride is treated with water to liberate the BF$_3$ from its combination with the aldehyde, the BF$_3$ being recovered from the aqueous portion. This procedure is effective on a small scale but on a larger scale leads to appreciable resinification of the tolualdehyde by the action of heat in the presence of the fluoride catalysts.

This invention provides a method of separating the organic components from the inorganic components of a mixture obtained from the carbonylation of toluene in the presence of hydrogen fluoride and boron trifluoride without the aforementioned disadvantages of the prior art, for example, the use of the large quantities of water or additional reactants employed in known procedures. The process of this invention yields such organic and inorganic components in a form in which they can be easily and economically processed further for recovery of valuable components therefrom.

The process of this invention for the recovery of p-tolualdehyde from the complex obtained by the carbonylation of toluene in the presence of hydrogen fluoride and boron trifluoride comprises the following steps:

(1) Thoroughly mixing the complex with aqueous hydrogen fluoride, the aqueous effluent obtained from Step (3) below and the organic effluent from Step (4) below, (2) Allowing the resulting mixture to stratify into an organic phase and an aqueous phase, (3) Countercurrently extracting the organic phase from Step (2) with water, returning the resulting aqueous effluent to Step (1) and withdrawing the resulting organic effluent comprising p-tolualdehyde in solution in toluene, and (4) Extracting the aqueous phase from Step (2) with toluene to yield an aqueous solution of boron trifluoride and hydrogen fluoride, the toluene effluent being used in Step (1), the concentration of the fluorides in the aqueous phase in each of the steps being less than about 70% by weight.

The aqueous extraction in Step (3) can be carried out in conventional liquid-liquid extraction equipment such as baffle plate columns, centrifugal countercurrent extractors, spray columns or perforated plate or sieve plate columns. Preferably, however, Step (3) is carried out in conventional mixer-settler equipment in a plurality of stages, preferably at least five stages. In each stage, the aqueous phase is thoroughly mixed with the organic phase and allowed to stratify again into aqueous or organic phases. The aqueous phase from each stage, that is, each mixing-settling operation, is withdrawn and introduced in the next preceding stage, and the organic phase containing p-tolualdehyde, toluene and residual fluorides from each stage is passed to the next succeeding stage. The water is introduced into and the p-tolualdehyde product solution is withdrawn from the last stage in Step (3), while the organic phase from Step (2) is introduced into and the aqueous effluent used in Step (1) is withdrawn from the first stage.

The washed organic phase from Step (3) is readily separated by conventional distillation procedures into p-tolualdehyde and toluene. The toluene conveniently can be recycled to Step (4) or can be used to prepare more p-tolualdehyde.

The extracted aqueous phase from Step (4) is readily susceptible to conventional processing, or to distillation as described hereinafter, to recover boron trifluoride and the hydrogen fluoride. Preferably, aqueous hydrogen fluoride obtained from such processing is used in Step (1). The hydrogen fluoride concentration in the aqueous hydrogen fluoride can be about from 5 to 60% by weight. Preferably, however, 38% aqueous hydrogen fluoride obtained from the product of Step (4) as described hereinafter is employed in Step (1). This 38% solution of hydrogen fluoride referred to is the usual azeotrope at standard atmospheric pressure, the content of hydrogen fluoride varying from about 36.5 to 40% by weight depending on the exact pressure during the distillation, and averaging about 38%. Therefore, as used herein, the term "38% aqueous hydrogen fluoride" refers to the azeotrope obtained at about atmospheric pressure. Because the atmospheric presure azeotrope of hydrogen fluoride and water is used in breaking the complex and physically facilitates separating the inorganic components from the organic components, and because this azeotrope is a product of the distillation of the aqueous phase, the economics of the present process are greatly superior to those wherein water alone is used to break the complex and the fluorides are either discarded or complete separation of the water and fluorides is attempted.

The process of the present invention will become more apparent by reference to the accompanying drawing which shows a schematic flow diagram of materials in a preferred multistage countercurrent treating process in accordance with the present invention. In the diagram, vessels 1 and 1a, 2 and 2a, 3 and 3a, etc., represent mixer-settler units wherein two substantially immiscible liquids of different specific gravities are vigorously agitated in the mixer units (1, 2, 3, etc.) to facilitate redistribution of components, and the mixtures then are passed to the corresponding settler units (1a, 2a, 3a, etc.) wherein the quiescent fluid mixtures are separated by gravity into an upper organic layer (O) and a lower aqueous layer (A). The layers then are separately withdrawn, the organic phase passing to the succeeding mixer unit and the aqueous phase passing to the preceding mixer unit. Each combination of mixer and settler provides one stage in the treatment process, and the number of mixer-settler units (stages) to be employed will depend upon the effectiveness of redistribution and separation of components in each stage.

A reaction product which is especially suitable for treatment by the process of the present invention is obtained by a process which involves reacting toluene, boron trifluoride, hydrogen fluoride and carbon-monoxide under superatmospheric pressure at a temperature from about −20° C. to about 100° C., and removing a substantial proportion of the unconsumed volatile reactants from the reaction mixture thus formed. The reaction product obtained in this way is variable in composition depending upon the specific conditions employed in carrying out the synthesis reaction and the subsequent separation of volatile reactants. In general, however, the reaction product obtained in this way will contain about 5 to 35% by weight of toluene, about 5 to 35% by weight of hydrogen fluoride, about 0.1 to 10% by weight of boron trifluoride, and about 50 to 90% by weight of a chemical complex of p-tolualdehyde, boron trifluoride, and hydrogen fluoride in the approximate molecular ratios of 1:1:2. Minor amounts of isomeric products and by-products also may be present in the crude reaction mixture.

Referring again to the accompanying drawing, in Step (1) the reaction product is fed to mixer 2 as indicated, together with the upper layer (mostly toluene) from settler unit 1a, 38% aqueous hydrogen fluoride, and the aqueous lower layer containing boron trifluoride and hydrogen fluoride from settler unit 3a. After ½ minute to 10 minutes vigorous agitation of the liquids in mixer 2, the mixture is passed to settler 2a where the layers form and are separated, and the upper organic (O) layer is passed to mixer 3a. The lower aqueous (A) layer is passed to mixer 1 where it is treated with fresh or recovered toluene to extract dissolved p-tolualdehyde. These solutions are passed from mixer 1 to settler 1a where the layers are separated, the upper organic layer being passed to stage 2 mixer, and the aqueous layer consisting essentially of water, boron trifluoride, and hydrogen fluoride being transferred to intermediate storage 4 as one of the products of the operation of the process of this invention.

In Step (4), extraction of the aqueous layer from stage 2a with toluene can be done in a single stage as indicated in the drawing, or in a plurality of stages in conventional manner. In either case, the resultant aqueous and organic layers pass into the system in the directions shown in the drawing.

Referring to the drawing, in Step (3) the organic phase or layer from settler 2a moves through a series of treatment stages, that is, mixer-settler units, where it is countercurrently extracted with water to remove residual fluorides. Preferably, as previously indicated, if mixer-settler units are employed for this step at least five stages are used. For simplicity, only the first (3 and 3a) and last (n and na) of these stages are indicated, the intervening stages, which operate in the same manner, being indicated by the broken feed lines between such first and last stages. The organic layer from the second last stage enters mixer n together with water. After the organic phase and water have been agitated in mixer n and then allowed to separate in settler na, the aqueous phase is passed to the next preceding mixer unit and the organic phase consisting essentially of p-tolualdehyde dissolved in toluene is withdrawn as a principal product of the operation of the process of this invention.

As indicated by the dotted lines in the drawing, the p-tolualdehyde can be separated from the toluene by conventional fractional distillation and the toluene returned, in whole or in part, to mixer 1 in Step (4) or to the synthesis operations for preparing the complex. Alternately, the p-tolualdehyde-toluene solution can be used as such in other synthesis, for example oxidation to form p-toluic acid and terephthalic acid.

The extracted aqueous inorganic product from Step (4) can be fractionally distilled to yield boron trifluoride, hydrogen fluoride, water and aqueous hydrogen fluoride, preferably the 38% aqueous hydrogen fluoride previously mentioned. This can be done, for example, by stripping anhydrous hydrogen fluoride from aqueous solution, then distilling the resulting product under reduced pressure, e.g., 75 mm. to yield dilute aqueous hydrogen fluoride which is then distilled under atmospheric pressure to yield the 38% hydrogen fluoride. Boron trifluoride can be obtained by distilling the bottoms from such vacuum distillation at super-atmpospheric pressure. Another method by which boron trifluoride and hydrogen fluoride can be recovered from aqueous solutions, for example, is disclosed in German Patent No. 938,964 wherein metal fluorides are used to complex boron trifluoride and hydrogen fluoride successively in a two-step process, after which the double salts are pyrolyzed to recover the dry boron trifluoride and dry hydrogen fluoride.

With further reference to the drawing, a desirable modification of the process is shown, again by dotted lines, wherein the aqueous phase A from settler 2a, instead of passing to mixer 1, is transferred to a scrubber 5 for enrichment by vapors of boron trifluoride and hydrogen fluoride from the complex synthesis and then to mixer 1 for extraction with toluene as described above. Another modification of the flow of materials provides for the toluene-extracted aqueous phase A from settler 1a to go to the scrubber 5, and then to intermediate storage 4 for subsequent fractionation as described above.

The process of the present invention is further illustrated by the following example in which all quantities are parts by weight unless otherwise identified.

A reaction product containing 16.8 parts by weight of toluene, 94.2 parts of HF, 63.8 parts of $BF_3$, and 72.3 parts of p-tolualdehyde (present as and equivalent to 137 parts of the aldehyde·$BF_3$·2HF complex) is introduced into mixer 2, together with toluene extract from settler 1a consisting essentially of 96.0 parts of toluene, 25.0 parts of p-tolualdehyde, 11.7 parts of HF and 0.9 part of $BF_3$, the toluene extract serving as diluent for the aldehyde complex obtained from the synthesis operation. Also into mixer 2 is introduced 47 parts of approximately 38% aqueous hydrogen fluoride containing a small amount of boron trifluoride. This feed in mixer 2 is subjected to an eight-stage countercurrent treatment (i.e., $n=9$) under substantially equilibrium conditions in the manner described above and illustrated in the drawing. Thirty parts of water is introduced into mixer 9 for each processing cycle, and fresh toluene, 94.5 parts, is introduced into mixer 1 to facilitate separation into organic and aqueous layers. The mixing time for each treatment stage is 0.5 minute, and settling time 1.5 minutes, including the toluene extraction (Step 4) and the countercurrent aqueous extraction (Step 3), all operations being carried out at 40° C.

The results achieved by the eight stage aqueous treatment of the reaction product, combined with the toluene extraction of p-tolualdehyde in mixer 1, are summarized in the tables below which show parts by weight of all materials added for the process, and the materials recovered as aqueous and organic phases.

FED TO PROCESS

|  | Parts by Weight | | | | |
|---|---|---|---|---|---|
|  | as 38% HF soln. | As Synthesis Mixture | As Toluene | As H$_2$O | Total |
| p-Tolualdehyde | | 72.3 | | | 72.3 |
| BF$_3$ | 0.7 | 63.8 | | | 64.5 |
| HF | 17.9 | 94.2 | | | 112.1 |
| Toluene | | 16.8 | 94.5 | | 111.3 |
| H$_2$O | 28.8 | | | 30 | 59.0 |

REMOVED FROM PROCESS

|  | Parts by Weight | | |
|---|---|---|---|
|  | Aqueous Phase | Organic Phase | Total |
| p-Tolualdehyde | trace | 74.8 | 74.8 |
| BF$_3$ | 62.1 | 0.1 | 62.2 |
| HF | 116.3 | 0.1 | 116.4 |
| Toluene | trace | 124.0 | 124.0 |
| H$_2$O | 62.0 | | 62.0 |

The discrepancies in total materials accountings are ascribable to the practical difficulties of multiple sampling and analysis of said samples. The results tabulated above show that the complex in the synthesis mixture is effectively broken down, and the components of the synthesis mixture redistributed into two fractions suitable for further processing in order to recover the several components thereof. Small amounts of fluorides remaining in the organic phase may be removed by a separate treatment, such as with bauxite, before fractionating to recover toluene and p-tolualdehyde, also as shown by dotted lines in the accompanying drawing.

Although it is preferable to carry out the process of our invention at about 40° C., the process is operable at other temperatures, for example, at temperatures of about from 20 to 80° C. Thus, fewer treatment stages are required at 20° C., but phase separations take place more slowly. On the other hand, at temperatures as high as 80° C., materials containment is more difficult, and higher heat inputs are required without compensating gains in process performance. Hence the process preferably is carried out at about 40° C.

Eight stages of treatment with aqueous media in Step (3) have been exemplified. This, however, is not an inflexible limit. The number of stages of treatment will be varied to obtain the economically most favorable result. In general, at least five stages will be used in Step (3). Although the toluene extraction, Step (4), carried out in vessels 1 and 1a has been exemplified as a single stage operation, economically more effective results can be achieved by multistage operation in a manner well known to those familiar with extraction procedures. Mixer-settler combinations for treatment and extraction are exemplified, but as previously indicated, the use of other types of liquid-liquid contacting and separating equipment is feasible for the practice of this invention.

Sufficient water must be introduced so that the concentration of fluorides in water does not exceed about 70% by weight at any stage in the process. When the concentration reaches 70%, the aqueous solution no longer will extract fluorides from the organic components. Inasmuch as recovery of fluorides from the aqueous solution is most economic when the concentration is highest, the concentration of the aqueous solution recovered from Step (4) preferably will have a concentration above 50% by weight of fluorides. The water is introduced into the process both as pure water and as aqueous hydrogen fluoride. The amount of pure water introduced in Step (3) must be sufficient to remove essentially all of the fluorides remaining in the organic phase after the initial breaking of the complex without forming an aqueous solution having a concentration greater than 70% by weight in combined fluorides. Water in excess of that required to form a solution having a concentration of fluorides below about 30% is undesirable because the quantity of liquid which must be processed for complete separation of the fluorides and water entails a substantial economic penalty. In general, the amount of water introduced as pure water will be between 20 and 60% of the total water introduced into the system. The remainder of the water is introduced as aqueous hydrogen fluoride.

The amount of toluene introduced to extract p-tolualdehyde from the aqueous phase as in mixer 1, is not critical provided sufficient quantity is present to facilitate separation and processing. Generally from 0.2 to 2 parts by weight of toluene per part of aqueous phase is preferred in Step (4).

The amount of toluene, i.e., organic effluent from Step (4), that is added to the reaction product in Step (1) must be sufficient to provide a workable solution, from 0.15 to 3.0 parts by weight of toluene per part of reaction product is preferred. A greater proportion of toluene only increases the volume of organic components to be processed without any additional benefit.

As is well known in the art, the p-tolualdehyde obtained in accordance with this invention can be oxidized with nitric acid to yield terephthalic acid which finds wide utility in the synthesis of polyesters.

We claim:

1. A process for the recovery of p-tolualdehyde from the complex obtained by the carbonylation of toluene in the presence of hydrogen fluoride and boron trifluoride which comprises the following steps carried out at a temperature of about from 20 to 80° C.:

(1) thoroughly mixing said complex with aqueous hydrogen fluoride containing about from 5 to 60% by weight of hydrogen fluoride, the aqueous effluent obtained from Step (3) below, and the organic effluent from Step (4) below, (2) allowing the resulting mixture to stratify into an organic phase and an aqueous phase, (3) countercurrently extracting the organic phase from Step (2) with water in an amount about from 20 to 60% of the total weight of water introduced in Step (1), returning the resulting aqueous effluent containing at least about 30% by weight of boron trifluoride and hydrogen fluoride to Step (1) and withdrawing the resulting organic effluent comprising the p-tolualdehyde product in solution in toluene, and (4) extracting the aqueous phase from Step (2) with toluene to yield an aqueous solution of boron trifluoride and hydrogen fluoride, the organic effluent being used in Step (1), the concentration of the fluorides in the aqueous phase in each of said steps being less than about 70% by weight.

2. A process of claim 1 wherein the countercurrent extraction in Step (3) is carried out in a plurality of stages, each stage comprising thoroughly mixing an organic phase with an aqueous phase, allowing the phases to stratify, and introducing the resulting aqueous phase into the next preceding stage and the resulting organic phase into the next succeeding stage, said water being introduced into and said solution of p-tolualdehyde in toluene being withdrawn from the last stage and said organic phase from Step (2) being introduced into and said aqueous effluent for Step (1) being withdrawn from the first stage.

3. A process of claim 2 wherein the aqueous solution obtained in Step (4) contains above 50% by weight of boron trifluoride and hydrogen fluoride.

4. A process of claim 2 wherein aqueous hydrogen fluoride from the aqueous solution obtained in Step (4) having a concentration of about from 36.5 to 40% by weight of hydrogen fluoride is used as said aqueous hydrogen fluoride in Step (1).

5. A process for the recovery of p-tolualdehyde from a mixture comprising about from 5 to 35% by weight of toluene, about from 5 to 35% by weight of hydrogen fluoride, about from 0.1 to 10% by weight of boron trifluoride, and about from 50 to 90% by weight of p-tolualdehyde-boron trifluoride-hydrogen fluoride complex which comprises the following steps carried out at a temperature of about from 20 to 80° C.:

(1) thoroughly mixing said mixture with aqueous hydrogen fluoride, from the product of Step (4) below, containing about from 36.5 to 40% by weight of hydrogen fluoride; the aqueous effluent from Step (3) below containing about from 30 to 70% by weight of boron trifluoride and hydrogen fluoride; and about from 0.15 to 3.0 parts by weight per part of said mixture of the organic effluent from Step (4) below, (2) allowing the resulting mixture to stratify into an organic phase and an aqueous phase, (3) countercurrently extracting the organic phase from Step (2) with water in a series of at least five stages, each stage comprising thoroughly mixing an organic phase with an aqueous phase, allowing the phases to stratify, and introducing the resulting aqueous phase into the next preceding stage and the resulting organic phase into the next succeeding stage, said water being introduced into and an organic effluent comprising p-tolualdehyde product in solution in toluene being withdrawn from the last stage, and said organic phase from Step (2) being introduced into and said aqueous effluent for Step (1) being withdrawn from the first stage, the water introduced in said last stage being 20 to 60% of the total water introduced in Step (1), and (4) extracting the aqueous phase from Step (2) with about from 0.2 to 2.0 parts by weight of toluene per part by weight of said aqueous phase to yield an aqueous solution containing above 50% by weight of boron trifluoride and hydrogen fluoride, the organic effluent being used in Step (1).

6. A process of claim 2 wherein said complex is obtained by reacting toluene, boron trifluoride, hydrogen trifluoride, and carbon monoxide under superatmospheric pressure at a temperature of about from $-20$ to $100°$ C. and thereafter removing a substantial proportion of the unconsumed volatile reactants from said complex.

7. A process of claim 5 wherein Steps (1) through (4) are carried out at a temperature of about 40° C.

References Cited by the Examiner

UNITED STATES PATENTS

| 2,462,739 | 2/1949 | Gresham | 260—599 |
| 2,485,237 | 10/1949 | Gresham et al. | 260—599 |
| 2,534,017 | 12/1950 | Gresham et al. | 260—599 |

FOREIGN PATENTS

| 938,964 | 2/1956 | Germany. |

LEON ZITVER, *Primary Examiner.*

J. J. SETELIK, R. H. LILES, *Assistant Examiners.*